Figure 2:
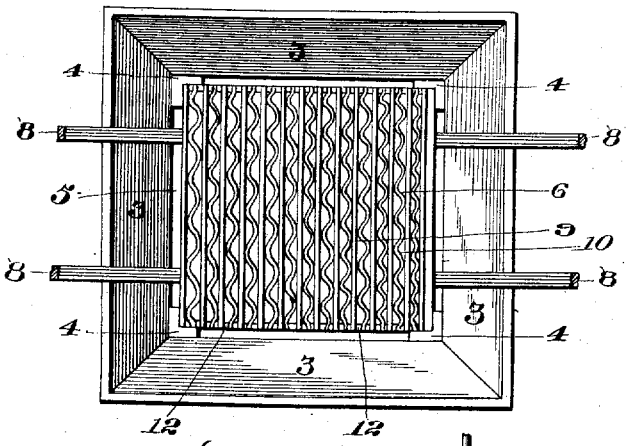

No. 11,676. Reissued July 5, 1898.

R. ASHLEY.

STORAGE OR SECONDARY BATTERY.

(Application filed Apr. 9, 1898.)

WITNESSES

Marcus L. Byng

Arthur A. Bryant

INVENTOR

Ralph Ashley by N. K. Bliss

Attorney

UNITED STATES PATENT OFFICE.

RALPH ASHLEY, OF PORT REPUBLIC, NEW JERSEY, ASSIGNOR, BY DIRECT AND MESNE ASSIGNMENTS, TO THE GUARANTOR ELECTRIC COMPANY OF CAMDEN, NEW JERSEY.

STORAGE OR SECONDARY BATTERY.

SPECIFICATION forming part of Reissued Letters Patent No. 11,676, dated July 5, 1898.

Original No. 594,313, dated November 23, 1897. Application for reissue filed April 9, 1898. Serial No. 677,101.

*To all whom it may concern:*

Be it known that I, RALPH ASHLEY, a citizen of the United States, residing at Port Republic, in the county of Atlantic and State of New Jersey, have invented certain new and useful Improvements in Storage or Secondary Batteries; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to secondary or storage batteries; and its object is to provide an improved construction of the same which shall possess superior advantages with respect to efficiency in use and which can be constructed in a cheap and economical manner.

The invention consists, essentially, in a battery composed of a number of cups or trays of rubber or other suitable material, each consisting of a rectangular base or lower portion with flaring or outwardly-extending upper sides and formed on the inner sides with supporting-lugs. These trays are nested one within the other or arranged in a vertical stack or pile, and each tray is supported by the lugs on the tray below. A positive and a negative plate or electrode are secured to the bottom of each tray except the lowermost one, the positive plate or electrode resting on the upper surface of the bottom and the negative plate or electrode secured to the under or lower side thereof. The said lowermost tray has a positive electrode on the inside only, the negative electrode being dispensed with, the first negative being placed above the positive electrode in the first tray. The positive and negative electrodes of each tray are electrically connected with each other by conductors, which run up along the outside of the tray and then down the inside thereof and contact with the electrolytic fluid. In the uppermost tray the negative plate or electrode is supported above the positive plate or electrode by insulating rods or strips interposed therebetween. The stack or pile thus constructed is supported upon a suitable base and inclosed by a box or housing having a vertical groove or grooves in its sides which slip over the stack. The positive plate or electrode of the lowermost tray or cup is provided with a conductor or conductors, which run up the sides of the same and up in the grooves in the housing and out through the top of the same, where they are connected together, and a negative conductor passing through said top is connected with the upper negative plate or electrode, all of which will be hereinafter fully described and claimed.

Figure 1:
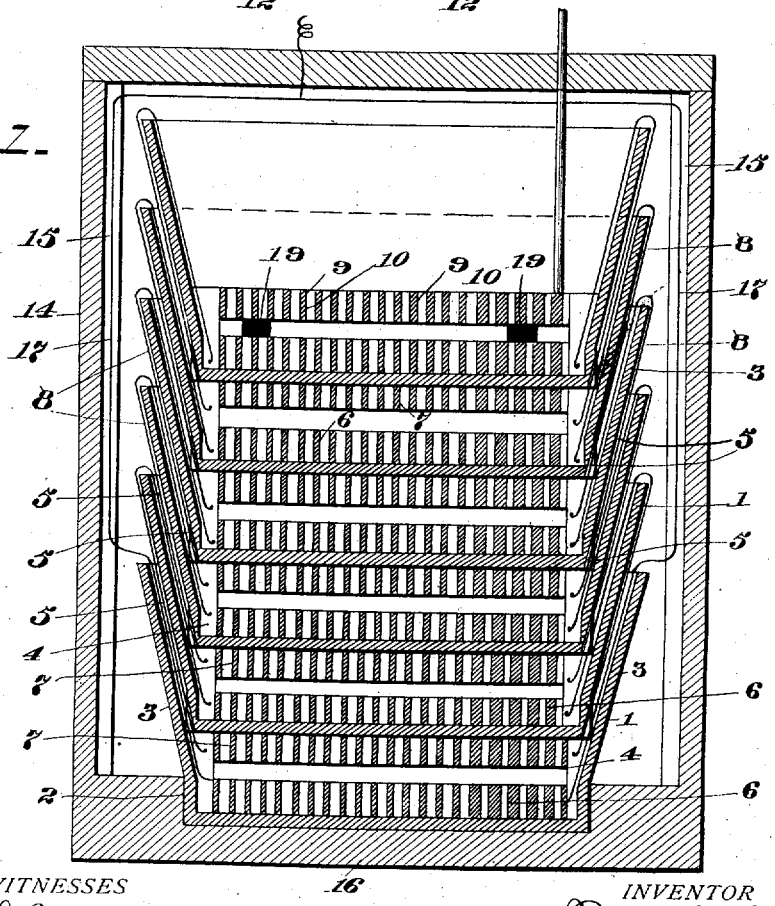
Figure 3:
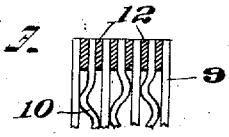

In the accompanying drawings, Figure 1 is a central longitudinal section of a storage or secondary battery constructed in accordance with my invention. Fig. 2 is a plan view of one of the trays or cups.

In the said drawings the reference-numeral 1 designates the cups or trays of rubber, lead, or other suitable material, each comprising a rectangular base 2, with upwardly-extending flaring sides 3. On the interior these trays or cups are formed at each corner with lugs 4 for supporting the tray above, with intervening spaces 5 for the passage of the conductors without contacting with the tray, as hereinafter described.

The numerals 6 and 7 designate the positive and negative plates or electrodes, the former being placed on the bottom of the trays, while the latter are secured to the outer or under sides of the bottom. These plates or electrodes are connected together by conductors 8, which pass from the negative plate or electrode up the outside of the tray and then down the inside thereof, the ends being immersed in the electrolytic fluid. These plates or electrodes consist of a number of flat horizontal lead strips 9, between which are interposed a number of corrugated lead strips 10, the corrugations forming spaces for the passage of the electrolytic fluid, while presenting a very large area for the fluid to act upon. The ends of the straight strips are separated from the corrugated strips by spacing-pieces 12, of lead, of a thickness corresponding with the space between the straight strips. The washers are soldered to said strips, so as to make a rigid connection.

The numeral 14 designates a rectangular box having a vertical groove or grooves 15 formed in its inner side. This box is open at the bottom and closed at the top and fits over the nested trays without coming in contact therewith and is secured to a base 16, upon which said trays are supported. Secured to the positive electrode of the lowermost tray are one or more conductors 17, which pass up the inside of the tray and thence into the groove in the side of the box and up the same to and through the top of the box. I prefer to employ two of these strips at opposite sides of the tray, which are connected together after leaving the same and extend up in the grooves in the opposite sides of the box, forming two conductors, as it were, which are connected together at their upper ends and passed through the top of the box. Also passing through said top is a conducting-lug 18, which is connected with a negative electrode seated on insulating strips or rods 19, which in turn rest upon and are supported by the positive electrode in the uppermost box.

The operation is as follows: The cups or trays are nested in one another, forming a vertical stack or pile, and are filled to the proper height with the exciting fluid, such as acidulated water. Electrolytic action will now take place in the usual manner and the current will come to the positive pole at the lower cell, and from thence pass to the positive electrode, and from thence through the electrolyte as a conductor to the negative electrode, and then through the conductor connected therewith to the positive electrode above, and so on throughout the series, constantly increasing in voltage or tension until the uppermost cell is reached, when it will leave the battery through the negative conductor or lug which constitutes the negative pole.

It will be seen that no bolts or rods are required to connect the trays together, and each tray being a complete cell in itself any number desired may be employed, thereby increasing or decreasing the power of the battery, according as more or less cells are employed. The positive conductor and the lug leading to the upper negative electrode pass loosely through the top of the box, so that the latter may be readily slipped off the stacked trays for refilling or other purposes, and said conductors being located in the grooves in the sides of the box are prevented from coming in contact with the trays.

The box or housing is to be lined with lead and all the joints are to be made tight, so that any acid boiling over from the trays would not run out on the floor.

Having thus fully described my invention, what I claim is—

1. In a secondary or storage battery, the combination with the superimposed trays or cups each consisting of a rectangular base, outwardly-flaring upwardly-extending sides and supporting-lugs on the inner sides at the corners thereof, with spaces between said lugs, of the conductors running along the outside of the trays and then down the inside thereof, and the electrodes, substantially as described.

2. In a secondary or storage battery, the combination with the trays of insulating material nested within each other to form a stack or pile, the positive electrodes located in said trays, the negative electrodes secured to the bottom or under side of the trays, and the conductors secured to said trays, of the base upon which said stack or pile is supported, the box or housing having a closed top fitting over said stack, and secured to the base, and formed with a groove on the inner side, the conductor seated in said groove and passing through the top of the housing and secured to the positive electrode of the lowermost tray, the conducting-lug passing through said top and connected with a negative electrode located in the uppermost tray, and the insulating-strips supported by the positive electrode in said tray, and upon which said negative electrode rests; substantially as described.

3. An electrode for a storage or other battery consisting of the horizontal, straight, and corrugated metal strips alternating with each other, and the spacing-pieces between the ends thereof, and soldered thereto, substantially as described.

4. A storage battery, comprising a series of superposed nested hard-rubber or non-conducting trays, each tray having a relatively thin upper flaring portion and a bottom portion with substantially vertical sides, there being at the bottom of each tray a support or rest for directly receiving the bottom of the tray above, the relatively thin upper portions being held out of contact with each other, whereby short-circuiting is prevented, means engaging with the bottom of each tray to hold it against lateral displacement, electrodes arranged in couples, one couple for each tray, and connecting-conductors, substantially as set forth.

5. A storage battery, comprising a series of superposed nested hard-rubber or non-conducting trays, each tray having an upper relatively thin flaring portion and a bottom portion having tray-supports integral therewith and extending above the bottom thereof and adapted to receive directly the superposed tray, a couple of electrodes for each tray arranged adjacent to the said tray-supports, each tray bearing laterally, at the bottom directly against the tray below and having its flaring upper portion out of contact with the adjacent trays, and conductors supplemental to the trays and respectively connecting the electrodes of one of said couples, substantially as set forth.

6. A storage battery, comprising a series of superposed nested hard-rubber or non-conducting trays, each tray having a lower portion with relatively short substantially vertical sides and an upper portion with relatively thin outwardly-flaring walls, and said bottom portion being thickened at suitable places to provide lugs adapted to directly contact with and support the bottom of the tray above, electrodes arranged in couples, each couple having one electrode below the bottom of its tray and the other electrode above said bottom and one insulated from the other by the said rubber or non-conducting material, and an electrical conductor connecting the electrodes of each couple, substantially as set forth.

In testimony whereof I affix my signature in presence of two witnesses.

RALPH ASHLEY.

Witnesses:

FRANCIS A. POWCK,
ANNIE ASHLEY.